(12) United States Patent
Phon et al.

(10) Patent No.: US 11,404,801 B2
(45) Date of Patent: Aug. 2, 2022

(54) CONNECTOR LOCKING WIRE OPERATING MECHANISM CAPABLE OF BUFFERING IMPACT ON A PUSH ROD

(71) Applicant: Anytek Technology (Shen Zhen) Co., Ltd., Shenzhen (CN)

(72) Inventors: Wai Kong Phon, Shenzhen (CN); Roy Zhang, Shenzhen (CN)

(73) Assignee: Anytek Technology (Shen Zhen) Co., Ltd.

( * ) Notice: Subject to any disclaimer, the term of this patent is extended or adjusted under 35 U.S.C. 154(b) by 0 days.

(21) Appl. No.: 17/264,444

(22) PCT Filed: Aug. 22, 2019

(86) PCT No.: PCT/CN2019/101934
§ 371 (c)(1),
(2) Date: Jan. 29, 2021

(87) PCT Pub. No.: WO2020/038430
PCT Pub. Date: Feb. 27, 2020

(65) Prior Publication Data
US 2022/0115792 A1 Apr. 14, 2022

(30) Foreign Application Priority Data
Aug. 22, 2018 (CN) .......................... 201821351250.X

(51) Int. Cl.
*H01R 4/48* (2006.01)
*F16P 3/00* (2006.01)
*H01R 13/426* (2006.01)
*H01M 50/543* (2021.01)

(52) U.S. Cl.
CPC .............. *H01R 4/4845* (2013.01); *F16P 3/00* (2013.01); *H01R 4/4827* (2013.01); *H01R 4/4836* (2013.01); *H01R 13/426* (2013.01); *H01M 50/543* (2021.01)

(58) Field of Classification Search
CPC .. H01R 4/4845; H01R 4/4827; H01R 4/4836; H01R 13/426; H01R 4/5008; H01R 4/4818; H01R 4/48; F16P 3/00; H01M 50/543
See application file for complete search history.

(56) References Cited

FOREIGN PATENT DOCUMENTS

| DE | 102015100823 A1 | * | 7/2016 | .......... | H01R 4/4836 |
| DE | 102019109467 A1 | * | 10/2020 | | |
| EP | 1432075 A1 | * | 6/2004 | .......... | H01R 4/4827 |

* cited by examiner

*Primary Examiner* — Travis S Chambers
(74) *Attorney, Agent, or Firm* — RowanTree Law Group, PLLC; Carson C. K. Fincham

(57) ABSTRACT

A connector locking wire operation mechanism capable of buffering an impact on a push rod includes a body provided with a push rod rotatable along an arcuate track and a cam rotatable about a circular hole. A sector notch capable of accommodating the cam and leaving sufficient space is provided at an inner side of the push rod. The push rod and the cam are cooperatively rotatable about a common rotation axis. Both sides of the cam are in contact with the push rod and a spring plate respectively.

7 Claims, 4 Drawing Sheets

CONNECTOR LOCKING WIRE OPERATING MECHANISM CAPABLE OF BUFFERING IMPACT ON A PUSH ROD

CROSS-REFERENCE TO RELATED APPLICATIONS

The present application is a U.S. National Phase 35 U.S.C. § 371 Application based on International Patent Application No. PCT/CN2019/101934 filed on Aug. 22, 2019 and published as WO/2020038430A1 on Feb. 27, 2020, which claims benefit and priority to Chinese Patent Application No. 201821351250.X filed on Aug. 22, 2018, the contents of each of which are hereby incorporated by reference herein in their entirety.

TECHNICAL FIELD

The disclosure relates to the mechanical field, in particular to a connector locking wire operating mechanism capable of buffering impact on a push rod.

BACKGROUND ART

In the prior art, the connector locking wire operating mechanism is provided with a push rod of an integrated structure.

SUMMARY

I. Technical Problem

When the push rod is rotated to unlock so that the spring plate is loosened and reset, the impact on the push rod caused by a spring force of an instantly and rapidly rebounding elastic member is not considered. When the push rod encounters a large impact, the operating end of the push rod may cause injury to an operator.

II. Technical Solution

The disclosure provides a connector locking wire operating mechanism capable of buffering impact on a push rod, which is intended to solve the technical problem of potential injury to an operator by too large impact at the moment when the spring plate rebounds.

The technical solution of the disclosure is provided as follows. A mechanism includes a body on which a push rod rotatable along an arcuate track and a cam rotatable about a circular hole are mounted. The push rod is provided with a sector notch at an inner side of the push rod which is capable of accommodating the cam and leaves a sufficient space. The push rod and the cam are cooperatively rotatable about a common rotation center. Both sides of the cam are in contact with the push rod and a spring plate respectively. By rotating the push rod, the cam is pushed to rotate to press down and lock the spring plate so that a locking wire hole of the spring plate is fully opened, facilitating the insertion or removal of a wire. By rotating the push rod in the other direction, the cam is pushed to release the spring plate, so that the locking wire hole of the spring plate is closed for locking.

Preferably, the spring plate is provided with a locking wire hole for accommodating a wire.

Preferably, the body is provided with the arcuate track for accommodating the push rod and a circular hole for fixing the cam.

Preferably, the push rod is provided with the sector notch at the inner side of the push rod which is capable of accommodating the cam and concentric with a rotation axis of the cam. The sector notch of the push rod has a central angle which is greater than a central angle of an outer periphery of the cam, thereby forming a space for buffering impact generated when the spring plate rebounds.

Preferably, the push rod is provided with a rib at the bottom of the push rod cooperating with a groove of the cam.

Preferably, both sides of the cam are in contact with the body and provided with a stopper pin cooperating with a stopper wall of the body.

Preferably, the push rod is provided with an arcuate rib for limiting rotation of the push rod in the arcuate track of the body.

Preferably, the body is provided with a damping stopper wall cooperating with the cam.

III. Beneficial Effect

Beneficial effects of the disclosure are as follows: (1) the push rod and the cam are of two-piece structure, the push rod is provided with a sector notch at an inner side of the push rod which is capable of receiving the cam, the sector notch of the push rod has a central angle which is greater than a central angle of an outer periphery of the cam, and the cam is rotatable reciprocally in the sector notch of the push rod; (2) rotation of the push rod can push the cam to rotate to press down the spring plate, until the stopper pin contacts the stopper wall on the body when the cam is in a steady state and locks the spring plate to the lowest point, so that the locking wire hole in the spring plate is fully opened, facilitating insertion or removal of a wire; meanwhile, the push rod is rotatable freely in a space of the sector notch; (3) after the push rod is rotated in a direction opposite to the operation by a certain angle, a slight push on the push rod can cause the cam to leave the stopper wall; when the cam crosses the steady-state critical point, the spring plate rebounds instantly and pushes the cam, causing a great impact on the cam, and at this moment the locking wire hole closes or locks the wire; the impact of the cam when passing through the space of the sector notch, is greatly weakened due to the damping and buffering, and therefore the impact transmitted to the push rod from the cam is greatly reduced, thereby avoiding injury to fingers of an operator; the cam stops rotating after touching the damping stopper wall at the opposite side to complete a complete operation process.

Figure 1:
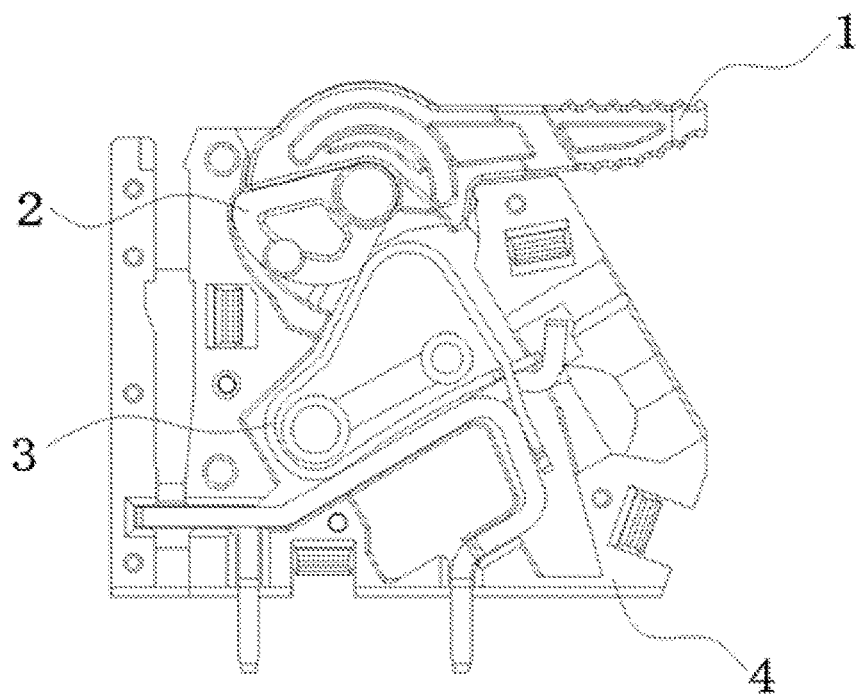
FIG. 1 is an overall structural diagram according to the disclosure.
Figure 2:
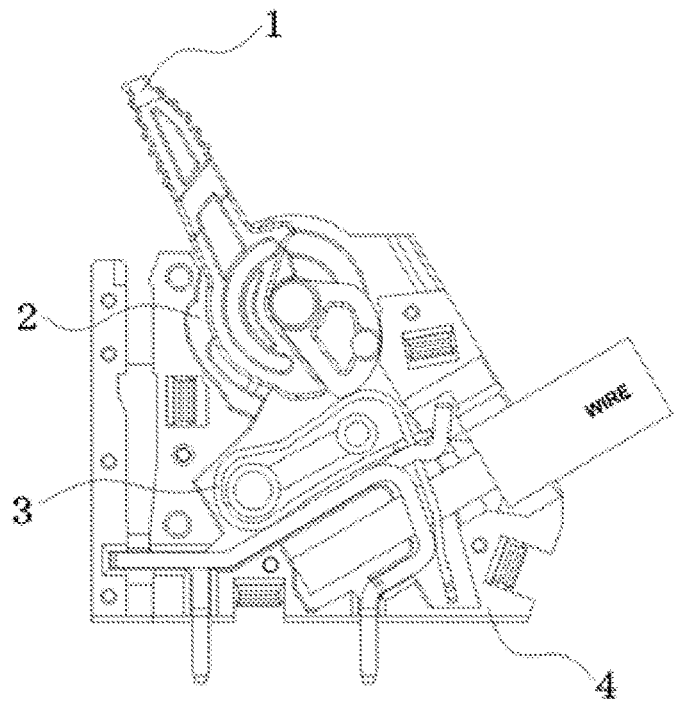
FIG. 2 is a schematic diagram in operating state according to the disclosure.
Figure 3:
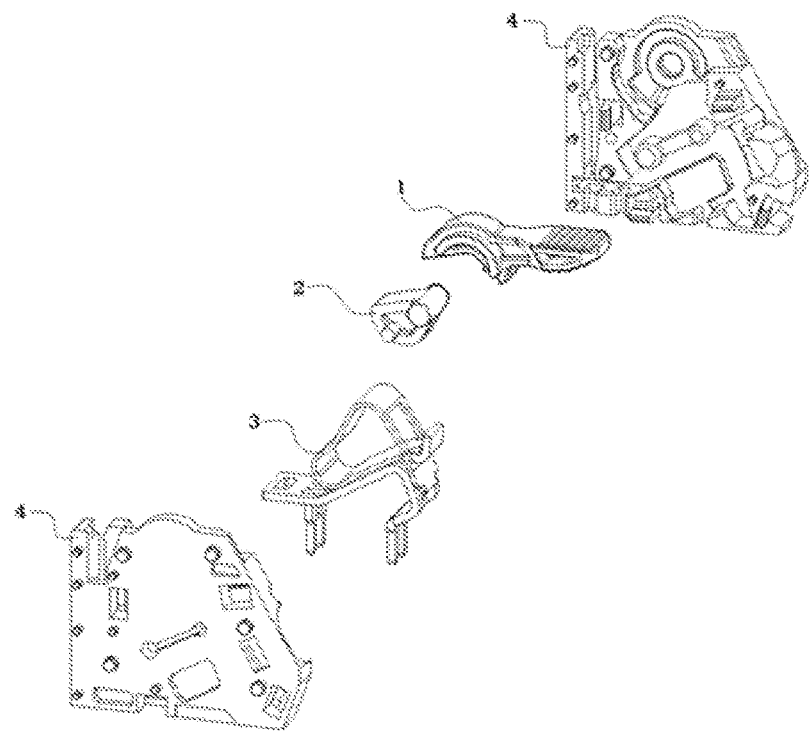
FIG. 3 is an exploded schematic diagram according to the disclosure.
Figure 4:
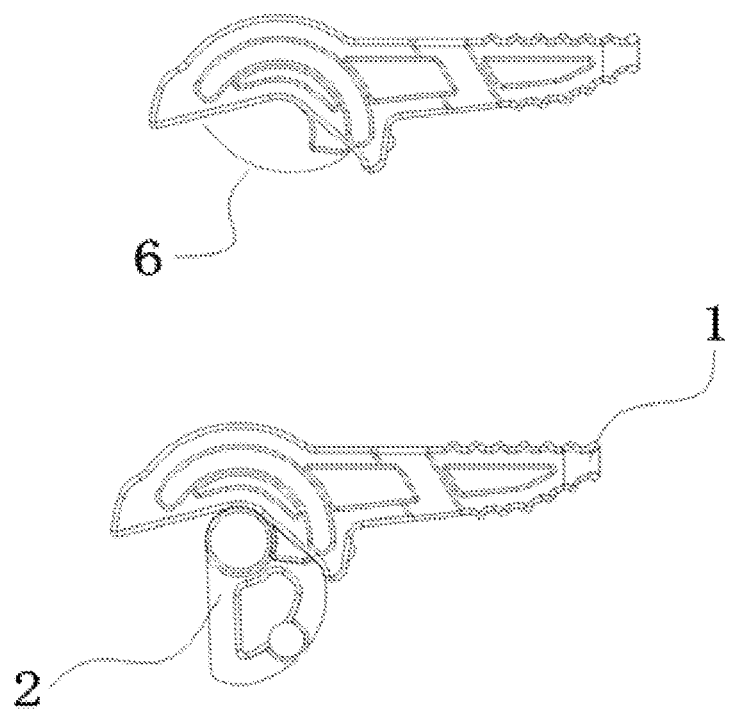
FIG. 4 is a schematic diagram of assembly of a push rod and a cam according to the disclosure.
Figure 5:
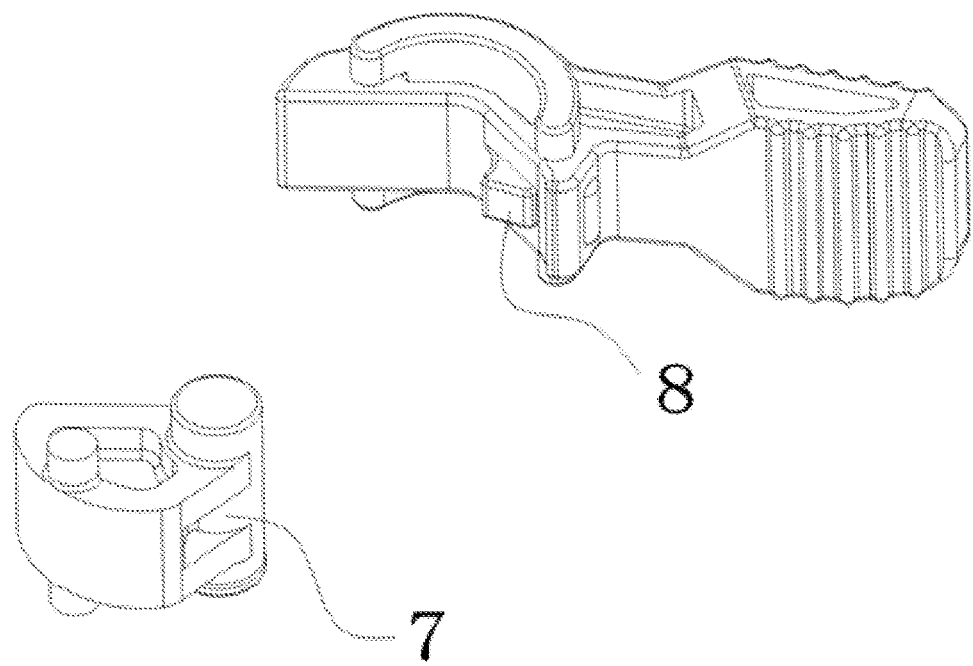
FIG. 5 is a schematic structural diagram of matching positions between a rib of the push rod and a groove of the cam.
Figure 6:
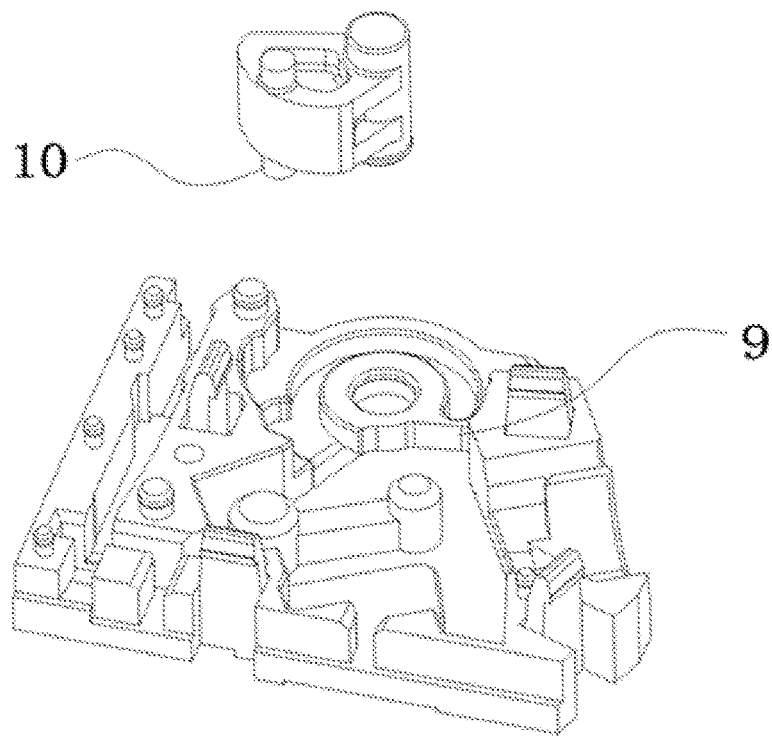
FIG. 6 is a schematic structural diagram of a stopper pin of the cam and a stopper wall of a body.
Figure 7:
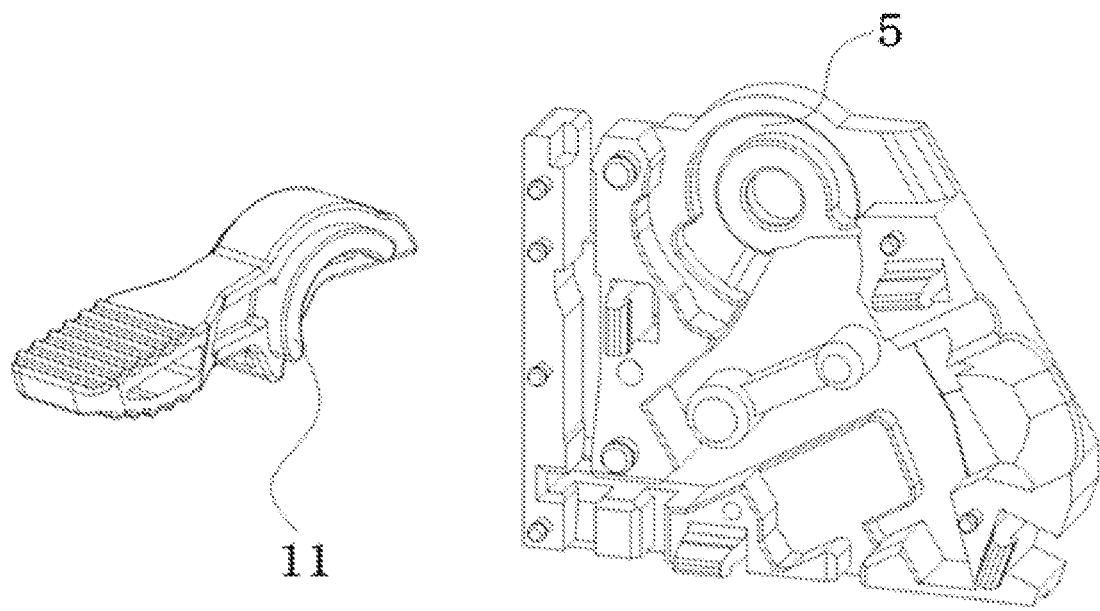
FIG. 7 is a schematic structural diagram of an arcuate rib of the push rod and an arcuate track of the body.
Figure 8:
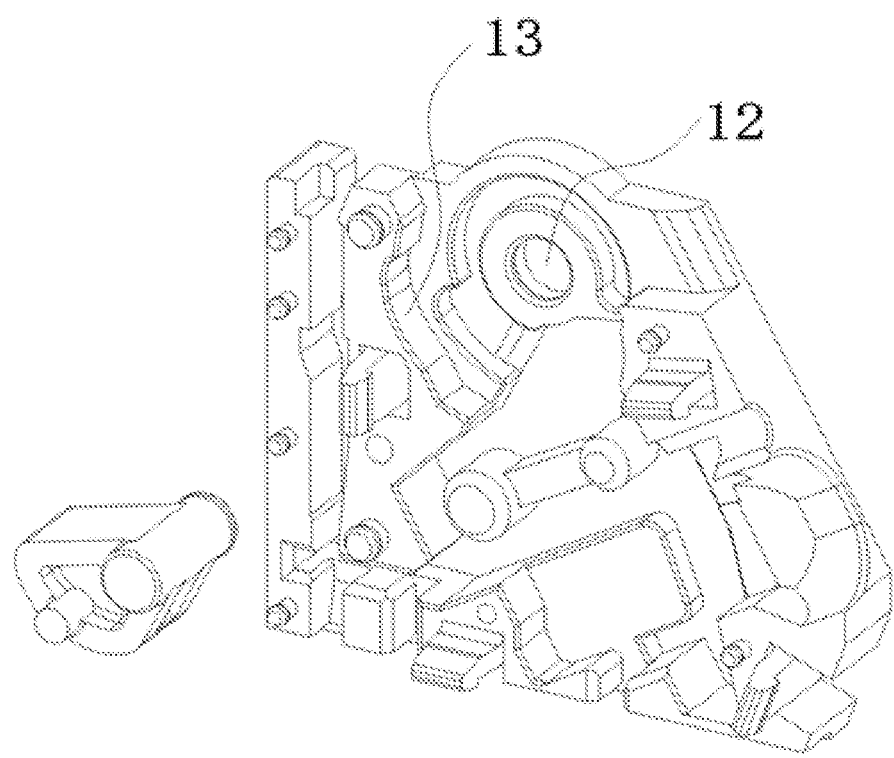
FIG. 8 is a schematic structural diagram of a damping stopper wall and a circular hole of the body.

1—push rod, 2—cam, 3—spring plate, 4—body, 5—arcuate track, 6—sector notch, 7—groove, 8—rib, 9—stopper wall, 10—stopper pin, 11—arcuate rib, 12—circular hole, 13—damping stopper wall.

PREFERRED IMPLEMENTATION OF THE DISCLOSURE

I. Embodiment One

A connector locking wire operating mechanism capable of buffering impact on a push rod includes a body (4) on which a push rod (1) rotatable along an arcuate track and a cam (2) rotatable about a circular hole (12) are mounted. The push rod (1) is provided with a sector notch (6) at an inner side of the push rod which is capable of accommodating the cam (2) and leaves a sufficient space. The push rod (1) and the cam (2) are cooperatively rotatable about a common rotation center. The cam (2) is rotatable reciprocally in the sector notch (6) of the push rod, with both sides of the cam (2) in contact with the push rod (1) and a spring plate (3) respectively. By rotating the push rod (1), the cam (2) is pushed to rotate to press down and lock the spring plate (3) so that a locking wire hole of the spring plate (3) is fully opened; by rotating the push rod (1) in the other direction, the cam (2) is pushed to release the spring plate (3), so that the locking wire hole of the spring plate (3) is locked. Instead of the existing integrated structure, the push rod (1) and the cam (2) are of two-piece structure and have a common rotation axis, by rotating the push rod (1), the cam (2) is pushed to rotate, and rotation of the cam (2) can press down and lock the spring plate (3), so that the locking wire hole of the spring plate (3) is fully opened to put in or take out the wire; by rotating the push rod (1) in the other direction, the cam is pushed to release the spring plate (3), so that the locking wire hole of the spring plate (3) is closed for locking.

IMPLEMENTATIONS OF THE DISCLOSURE

II. Embodiment Two

A connector locking wire operating mechanism capable of buffering impact on a push rod includes a body (4) on which a push rod (2) rotatable along an arcuate track and a cam (2) rotatable about a circular hole (12) are mounted. The push rod (1) is provided with a sector notch (6) at an inner side of the push rod which is capable of accommodating the cam (2) and leaves a sufficient space. The push rod (1) and the cam (2) are cooperatively rotatable about a common rotation center. The cam (2) is rotatable reciprocally in the sector notch (6) of the push rod, with both sides of the cam (2) in contact with the push rod (1) and a spring plate (3) respectively. By rotating the push rod (1), the cam (2) is pushed to rotate to press down and lock the spring plate (3) so that a locking wire hole of the spring plate (3) is fully opened; by rotating the push rod (1) in the other direction, the cam (2) is pushed to release the spring plate (3), so that the locking wire hole of the spring plate (3) is locked. The body (4) is provided with a track (5) for accommodating the push rod (1) and limiting rotation of the push rod (1), and a circular hole (12) for fixing the cam (2), and the spring plate (3) is provided with a locking wire hole for accommodating a wire.

III. Embodiment Three

A connector locking wire operating mechanism capable of buffering impact on a push rod includes a body (4) on which a push rod (3) rotatable along an arcuate track and a cam (2) rotatable about a circular hole (12) are mounted. The push rod (1) is provided with a sector notch (6) at an inner side of the push rod which is capable of accommodating the cam (2) and leaves a sufficient space. The push rod (1) and the cam (2) are cooperatively rotatable about a common rotation center. The cam (2) is rotatable reciprocally in the sector notch (6) of the push rod, with both sides of the cam (2) in contact with the push rod (1) and a spring plate (3) respectively. By rotating the push rod (1), the cam (2) is pushed to rotate to press down and lock the spring plate (3) so that a locking wire hole of the spring plate (3) is fully opened; by rotating the push rod (1) in the other direction, the cam (2) is pushed to release the spring plate (3), so that the locking wire hole of the spring plate (3) is locked. The push rod (1) is provided with the sector notch (6) at the inner side of the push rod (1) which is capable of accommodating the cam (2) and concentric with a rotation axis of the cam (2). The sector notch (6) of the push rod (1) has a central angle which is greater than a central angle of an outer periphery of the cam (2), thereby forming a space for buffering impact generated when the spring plate (3) rebounds.

IV. Embodiment Four

A connector locking wire operating mechanism capable of buffering impact of a push rod includes a body (4) on which a push rod (4) rotatable along an arcuate track and a cam (2) rotatable about a circular hole (12) are mounted. The push rod (1) is provided with a sector notch (6) at an inner side of the push rod which is capable of accommodating the cam (2) and leaves a sufficient space. The push rod (1) and the cam (2) are cooperatively rotatable about a common rotation center. The cam (2) is rotatable reciprocally in the sector notch (6) of the push rod, with both sides of the cam (2) in contact with the push rod (1) and a spring plate (3) respectively. By rotating the push rod (1), the cam (2) is pushed to rotate to press down and lock the spring plate (3) so that a locking wire hole of the spring plate (3) is fully opened; by rotating the push rod (1) in the other direction, the cam (2) is pushed to release the spring plate (3), so that the locking wire hole of the spring plate (3) is locked. The push rod (1) is provided with a rib (8) at a bottom of the push rod (1) cooperating with a groove (7) of the cam (2), which functions to facilitate rotation of the cam (2) and the push rod (1) about the common rotation axis. The sector notch (6) of the push rod (1) has a central angle which is greater than a central angle of an outer periphery of the cam (2), thereby forming a space for buffering impact generated when the spring plate (3) rebounds.

V. Embodiment Five

A connector locking wire operating mechanism capable of buffering impact on a push rod includes a body (4) on which a push rod (5) rotatable along an arcuate track and a cam (2) rotatable about a circular hole (12) are mounted. The push rod (1) is provided with a sector notch (6) at an inner side of the push rod which is capable of accommodating the cam (2) and leaves a sufficient space. The push rod (1) and the cam (2) are cooperatively rotatable about a common rotation center. The cam (2) is rotatable reciprocally in the sector notch (6) of the push rod, with both sides of the cam (2) in contact with the push rod (1) and a spring plate (3) respectively. By rotating the push rod (1), the cam (2) is pushed to rotate to press down and lock the spring plate (3) so that a locking wire hole of the spring plate (3) is fully opened; by rotating the push rod (1) in the other direction, the cam (2) is pushed to release the spring plate (3), so that the locking wire hole of the spring plate (3) is locked. The push rod (1) is provided with an arcuate rib (11) for limiting rotation of the push rod (1) in the arcuate track (5) of the body (4), and the arcuate rib (11) limits rotation of the push rod (1) along the arcuate track on the body (4).

VI. Embodiment Six

A connector locking wire operating mechanism capable of buffering impact on a push rod includes a body (4) on which a push rod (6) rotatable along an arcuate track and a cam (2) rotatable about a circular hole (12) are mounted. The push rod (1) is provided with a sector notch (6) at an inner side of the push rod which is capable of accommodating the cam (2) and leaves a sufficient space. The push rod (1) and the cam (2) are cooperatively rotatable about a common rotation center. The cam (2) is rotatable reciprocally in the sector notch (6) of the push rod, with both sides of the cam (2) in contact with the push rod (1) and a spring plate (3) respectively. By rotating the push rod (1), the cam (2) is pushed to rotate to press down and lock the spring plate (3) so that a locking wire hole of the spring plate (3) is fully opened; by rotating the push rod (1) in the other direction, the cam (2) is pushed to release the spring plate (3), so that the locking wire hole of the spring plate (3) is locked. The cam (2) is provided at both sides in contact with the body (4) with a stopper pin (10) cooperating with a stopper wall (9) of the body (4), which limits a final position of rotation of the cam (2).

VII. Embodiment Seven

A connector locking wire operating mechanism capable of buffering impact on a push rod includes a body (4) on which a push rod (7) rotatable along an arcuate track and a cam (2) rotatable about a circular hole (12) are mounted. The push rod (1) is provided with a sector notch (6) at an inner side of the push rod which is capable of accommodating the cam (2) and leaves a sufficient space. The push rod (1) and the cam (2) are cooperatively rotatable about a common rotation center. The cam (2) is rotatable reciprocally in the sector notch (6) of the push rod, with both sides of the cam (2) in contact with the push rod (1) and a spring plate (3) respectively. By rotating the push rod (1), the cam (2) is pushed to rotate to press down and lock the spring plate (3) so that a locking wire hole of the spring plate (3) is fully opened; by rotating the push rod (1) in the other direction, the cam (2) is pushed to release the spring plate (3), so that the locking wire hole of the spring plate (3) is locked. Rotation of the push rod (1) can push the cam (2) to rotate to press down the spring plate (3) until the stopper pin (10) contacts the stopper wall (9) on the body (4) when the cam (2) is in a steady state and locks the spring plate (3) to the lowest point, so that the locking wire hole in the spring plate (3) is in an open state, and the wire can be inserted or removed.

VIII. Embodiment Eight

A connector locking wire operating mechanism capable of buffering impact on a push rod includes a body (4) on which a push rod (8) rotatable along an arcuate track and a cam (2) rotatable about a circular hole (12) are mounted. The push rod (1) is provided with a sector notch (6) at an inner side of the push rod which is capable of accommodating the cam (2) and leaves a sufficient space. The push rod (1) and the cam (2) are cooperatively rotatable about a common rotation center. The cam (2) is rotatable reciprocally in the sector notch (6) of the push rod, with both sides of the cam (2) in contact with the push rod (1) and a spring plate (3) respectively. By rotating the push rod (1), the cam (2) is pushed to rotate to press down and lock the spring plate (3) so that a locking wire hole of the spring plate (3) is fully opened; by rotating the push rod (1) in the other direction, the cam (2) is pushed to release the spring plate (3), so that the locking wire hole of the spring plate (3) is locked. The sector notch (6) of the push rod (1) has a central angle which is greater than a central angle of an outer periphery of the cam (2), thereby forming a space for the push rod (1) to rotate freely and reciprocally within a certain range when the cam (2) is pushed to a steady state by the push rod (1).

IX. Embodiment Nine

A connector locking wire operating mechanism capable of buffering impact on a push rod includes a body (4) on which a push rod (9) rotatable along an arcuate track and a cam (2) rotatable about a circular hole (12) are mounted. The push rod (1) is provided with a sector notch (6) at an inner side of the push rod which is capable of accommodating the cam (2) and leaves a sufficient space. The push rod (1) and the cam (2) are cooperatively rotatable about a common rotation center. The cam (2) is rotatable reciprocally in the sector notch (6) of the push rod, with both sides of the cam (2) in contact with the push rod (1) and a spring plate (3) respectively. By rotating the push rod (1), the cam (2) is pushed to rotate to press down and lock the spring plate (3) so that a locking wire hole of the spring plate (3) is fully opened; by rotating the push rod (1) in the other direction, the cam (2) is pushed to release the spring plate (3), so that the locking wire hole of the spring plate (3) is locked. A slight push on the push rod (1) can cause the cam (2) to leave the stopper wall (9) and cross the steady-state critical point, then the spring plate (3) rebounds instantly and pushes the cam (2), causing a great impact on the cam (2), and at this moment the locking wire hole closes or locks the wire.

X. Embodiment Ten

A connector locking wire operating mechanism capable of buffering impact on a push rod includes a body (10) on which a push rod (4) rotatable along an arcuate track and a cam (2) rotatable about a circular hole (12) are mounted. The push rod (1) is provided with a sector notch (6) at an inner side of the push rod which is capable of accommodating the cam (2) and leaves a sufficient space. The push rod (1) and the cam (2) are cooperatively rotatable about a common rotation center. The cam (2) is rotatable reciprocally in the sector notch (6) of the push rod, with both sides of the cam (2) in contact with the push rod (1) and a spring plate (3) respectively. By rotating the push rod (1), the cam (2) is pushed to rotate to press down and lock the spring plate (3) so that a locking wire hole of the spring plate (3) is fully opened; by rotating the push rod (1) in the other direction, the cam (2) is pushed to release the spring plate (3), so that the locking wire hole of the spring plate (3) is locked. The impact of the cam (2) when passing through the space of the sector notch is greatly weakened due to the friction damping and buffering between the cam (2) and the inner damping stopper wall (13) of the body (4), and therefore the impact transmitted to the push rod (1) is greatly reduced, thereby avoiding injury to fingers of an operator.

What is claimed is:

1. A connector locking wire operating mechanism capable of buffering impact on a push rod comprising a body on which a push rod rotatable along an arcuate track and a cam rotatable about a circular hole are mounted, wherein the push rod is provided with a sector notch at an inner side of the push rod which is capable of accommodating the cam, the push rod and the cam being cooperatively rotatable about a common rotation center, the cam-being rotatable reciprocally in the sector notch of the push rod, with both sides of the cam in contact with the push rod and a spring plate respectively, wherein both sides of the cam are in contact with the body and provided with a stopper pin cooperating with a stopper wall of the body.

2. The connector locking wire operating mechanism capable of buffering impact on a push rod of claim 1, wherein the spring plate is provided with a locking wire hole for accommodating a wire.

3. The connector locking wire operating mechanism capable of buffering impact on a push rod of claim 1, wherein the body is provided with the arcuate track for accommodating the push rod and a circular hole for fixing the cam.

4. The connector locking wire operating mechanism capable of buffering impact on a push rod of claim 1, wherein the push rod is provided with the sector notch at the inner side of the push rod which is capable of accommodating the cam and concentric with a rotation axis of the cam.

5. The connector locking wire operating mechanism capable of buffering impact on a push rod of claim 1, wherein the push rod is provided with a rib at a bottom of the push rod cooperating with a groove of the cam.

6. The connector locking wire operating mechanism capable of buffering impact on a push rod of claim 1, wherein the push rod is provided with an arcuate rib for limiting rotation of the push rod in the arcuate track of the body.

7. The connector locking wire operating mechanism capable of buffering impact on a push rod of claim 1, wherein the body is provided with a damping stopper wall cooperating with the cam.

* * * * *